TRANSMISSION SYSTEM FOR USE IN A SUBSCRIPTION RADIO COMMUNICATION SYSTEM

Filed Nov. 15, 1965 3 Sheets-Sheet 1

INVENTORS
Shoichi Nakamura
Eizo Mori
BY
Stevens, Davis, Miller & Mosher ATTORNEYS INVENTORS
Shoichi Nakamura
Eizo Mori
BY
Stevens, Davis, Miller & Mosher
ATTORNEYS INVENTORS
Shoichi Nakamura
Eizo Mori
BY
Stevens, Davis, Miller & Mosher
ATTORNEYS

United States Patent Office 3,381,223 Patented Apr. 30, 1968

3,381,223

TRANSMISSION SYSTEM FOR USE IN A SUBSCRIPTION RADIO COMMUNICATION SYSTEM

Shoichi Nakamura, Tanbayashi-shi, and Eizo Mori, Uji-shi, Japan, assignors to Matsushita Electric Industrial Co., Ltd., Osaka, Japan, a corporation of Japan Filed Nov. 15, 1965, Ser. No. 507,882
Claims priority, application Japan, Nov. 18, 1964, 39/65,689
1 Claim. (Cl. 325—34)

ABSTRACT OF THE DISCLOSURE

A transmission system for use in a subscription radio communication system in which an interference or disturbance signal is superposed on an information signal to be communicated comprising means for quantizing an information signal, means for producing an interference signal the amplitude of which is varying so as to be either decreased or increased in accordance with the increase or decrease of the amplitude of the information signal and means for mixing the information signal and the varying interference signal to obtain a constant amplitude transmission signal which is particularly effective for FM transmission.

This invention relates to radio communication systems and more particularly to those of the type in which reception is allowed only to subscribers to the system while preventing poaching or unauthorized utilization of the service by any non-subscribers.

With radio communication systems in which programs are transmitted to subscribers to the system more or less like a radio broadcast as in the so-called SCA (Subsidiary Communication Authorization) service, there always is the problem of radio poaching by many non-subscribers who are occasionally interested in the broadcast program. This is due to the fact that the SCA services are now licensed to FM broadcasting stations and that FM receiver sets can always be put on the market which include additional circuits enabling reception of any broadcast program of SCA services. This situation is naturally giving a serious worry to SCA service companies.

In the field of so-called "privacy communication," many systems have previously been proposed in which information is transmitted in a form entirely unintelligible to the outsider. One limitation to the SCA and other like communication systems which serve the subscribers to the system with background music and other programs is that considerations are required to enable such programs to be received with a tone quality high enough to make them enjoyable to subscribers. This makes a marked difference between the type of communication system with which the present invention is concerned and the privacy communication, which is intended solely for the transmission of information. Further, with communication systems of the type concerned, any increase in cost of receiver sets is not allowable even with the intention of preventing any outsiders from poaching the broadcast programs. Particularly with the case of SCA services, as receiver sets are usually lent to subscribers but not sold to them, it is prerequisite that receiver sets must be relatively cheap, simple in structure and easy to maintain.

It can be readily supposed that any thought of poaching on the part of non-subscribers will be effectively held down if the transmission of programs is effected with a signal-to-noise ratio low enough to give discomfort to unauthorized listeners, who use commercially available FM receiving sets including additional circuits for the purpose.

It will be apparent, therefore, that the poaching can be effectively prevented if a radio communication system is obtained in which the program transmission is effected in such a fashion that the programs can be received with a satisfactory tone quality through receiving sets held by subscribers to the system but non-subscribers can receive the programs only with a signal-to-noise ratio so low as to repress their desire to listen to the program transmitted.

In view of the above, the present invention proposes to superpose an audible-frequency disturbance signal on the transmission signal and to employ on the receiver side a narrow-band stop filter for rejection of the disturbance signal thereby to realize a radio communication system which is free from the danger that the programs will be poached by outsiders.

The present invention will now be described in detail with reference to the accompanying drawings, which illustrate a few embodiments of the invention and in which.

Figures 1, 2, 4:
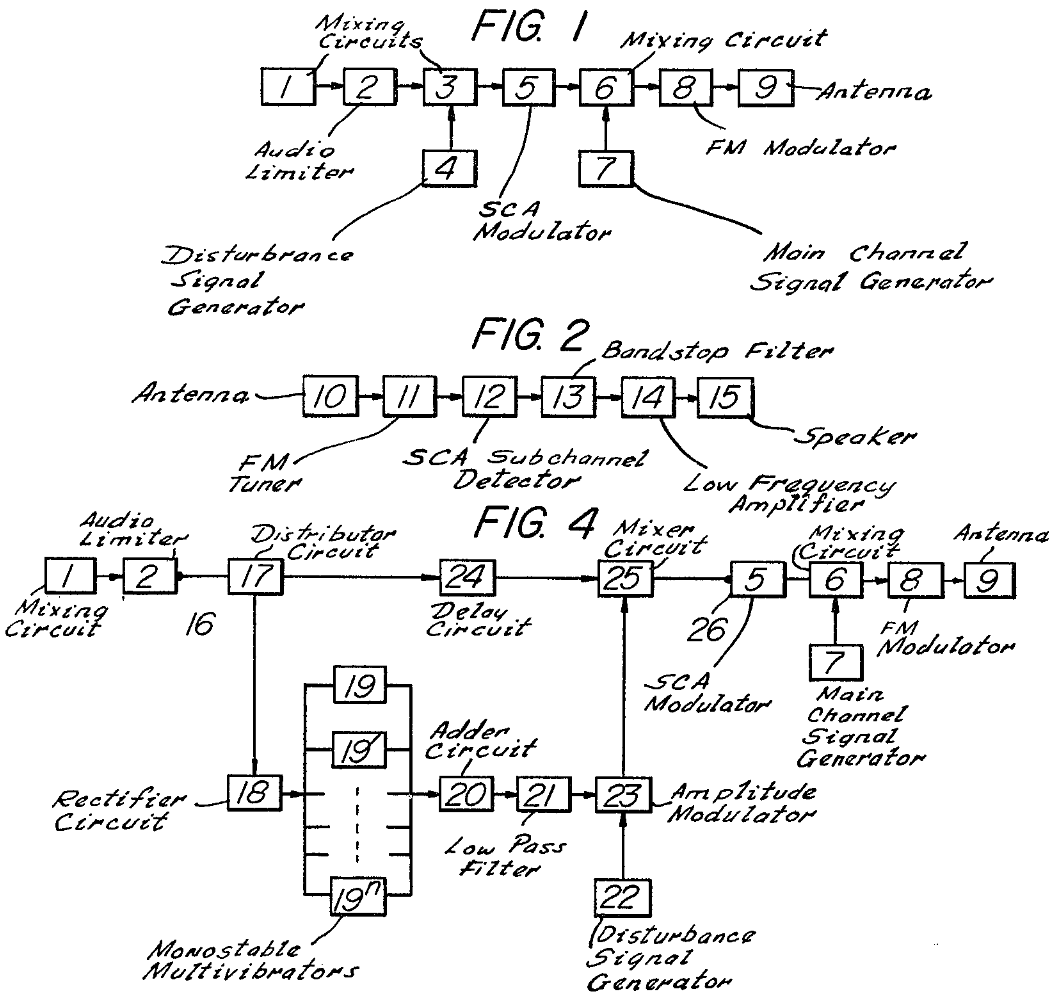
FIG. 1 is a block diagram showing the transmission system of one embodiment of the present invention.
FIG. 2 is a block diagram showing the reception system of same.
FIG. 4 is a block diagram showing the transmission system of another embodiment of the invention.

Referring first to FIG. 1, which illustrates the transmission system as applied to a SCA station, reference numeral 1 indicates a mixing circuit for mixing the signal input from a microphone, magnetic tape or record disc and, in this circuit, the audio signal is controlled. Reference numeral 2 indicates an audio limiter provided for maintaining the maximum frequency deviation of the SCA subcarrier within a range not exceeding a prescribed value. Reference numeral 3 indicates a mixing circuit for superposing a disturbance signal from a disturbance-signal generating circuit 4 on the desired signal.

The ratio between the magnitudes of the desired and disturbance signals is determined by what percentage of the maximum frequency deviation of the subcarrier is allocated to the disturbance signal. Reference numeral 5 indicates an SCA modulator; 6 indicates a mixing circuit for mixing the SCA signal with a main-channel signal 7; 8 indicates an FM modulator; and 9 indicates a transmission antenna.

It will be recognized that the electric wave propagated from the transmission system described above cannot be satisfactorily received by any commercially available receiving sets because of the disturbance signal involved. One example of receiver circuit arrangement adapted to properly receive the wave transmitted from the above transmission system is illustrated in FIG. 2.

Referring to FIG. 2, reference numeral 10 indicates a receiving antenna; 11 indicates an FM tuner; 12 indicates a detector for the SCA subchannel; 13 indicates a band-stop filter for rejecting the frequency range of the audible-frequency disturbance signal added to the desired signal on the transmitter side; 14 indicates a low-frequency amplifier; and 15 indicates a speaker.

Figure 3:
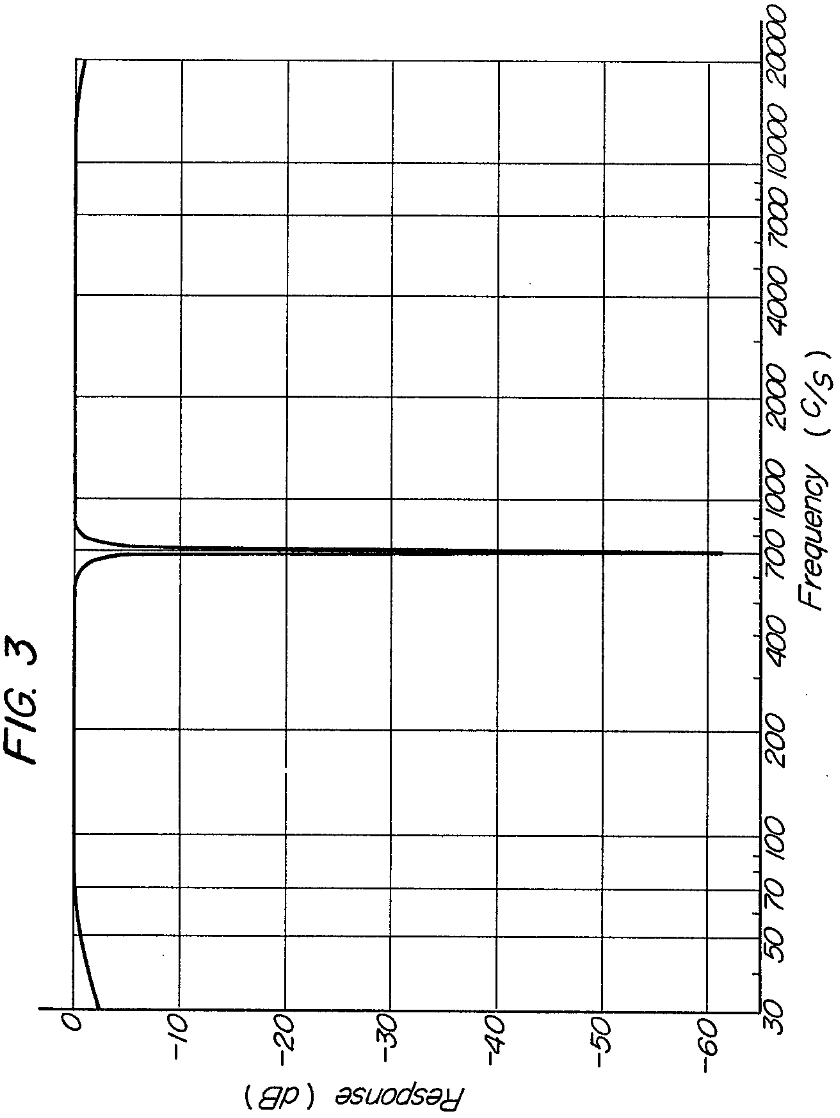
FIG. 3 illustrates the transmission characteristic of a band-stop filter usable in the present invention.

FIG. 3 illustrates one example of transmission characteristics of the band-stop filter 13, which is equivalent to the overall frequency characteristic of the receiver where a sinusoidal disturbance sound signal of 700 cycles per second is added on the transmitter side and it is indicated that the 700 c.p.s. disturbance sound is here suppressed by more than 60 db.

The filter 13 has a rejecting bandwidth of the order of 60 cycles per second. It is noted that, even where a valley of the above order is caused in the overall frequency characteristics curve of the receiver to result in a partial energy loss of the desired signal corresponding to the frequency range thus rejected, such energy loss does not cause any substantial deterioration of the tone quality of the signal as received and the program can be received with a satisfactory tone quality.

In this connection, it is noted that the best results can be obtained when the frequency of the disturbance signal is selected in the range between 400 and 2000 cycles per second since the human ear is highly sensitive to sound in this range and the signal of such sound frequency cannot be effectively attenuated by means of the tone-controlling circuit of the receiver.

Though the objective of the present invention can be fully attained with the arrangement described above, the communication system of the invention can be further improved by use of a transmission system modified in the following manner.

With the transmission system shown in FIG. 1, the disturbance signal superposed on the desired signal has a predetermined amplitude. Therefore, in cases where the sum of the amplitudes of the desired and disturbance signals is limited to a certain value, the amplitude of the desired signal must be reduced with increase in amplitude of the disturbance signal. This, apparently, is undesirable for FM transmission.

FIG. 4 illustrates another embodiment modified to overcome the above deficiency. This embodiment is similar to the one shown in FIG. 1 except the circuit portion arranged between the output end 16 of the audio limiter 2 and the input end 26 of the SCA modulator 5 to serve the purpose of mixing the disturbance signal. With this arrangement, the amplitude of the desired signal is quantized and the amplitude of the disturbance signal to be mixed with the desired signal is varied in accordance with its quantized amplitude contrariwise thereto. That is, with this modified system, the amplitude of the disturbance signal employed is increased or decreased with decrease or increase in amplitude of the desired signal so as to obtain a combined signal amplitude of a predetermined magnitude. This apparently forms an important advantage of the transmission system when used for FM transmission of programs.

Referring to FIG. 4, the desired signal from terminal 16 first enters a distributor circuit 17 and a portion of the signal is directed into a rectifier circuit 18 for full-wave rectification. Assuming that the desired signal has an initial waveform shown in FIG. 5*a*, the signal is transformed by the rectifier circuit 18 into a waveform shown in FIG. 5*b*, with all its peaks now appearing on the side of positive polarity.

Reference numerals 19, 19′, 19″ . . . $\mathbf{19^{(n)}}$ indicate a circuit arrangement for quantizing the amplitude of the output of the rectifier circuit 18 into discrete values $m_1, m_2 \ldots m_n$. This arrangement, for example, includes a mutually separated parallel connection of monostable multivibrators having different trigger levels.

Let it be assumed that the monostable multivibrators 19, 19′, 19″ . . . $\mathbf{19^{(n)}}$ have trigger levels set at $m_1$, $m_2 \ldots m_n$, respectively. Then, the first monostable multivibrator 19 is triggered by those peaks of the rectifier output which exceed the value $m_1$ to obtain an output waveform shown in FIG. 5*c*. Similarly, the second and third multivibrators 19′ and 19″ are triggered at the levels of $m_2$ and $m_3$, respectively, to obtain waveforms of FIGS. 5*d* and 5*e*.

Figure 5:
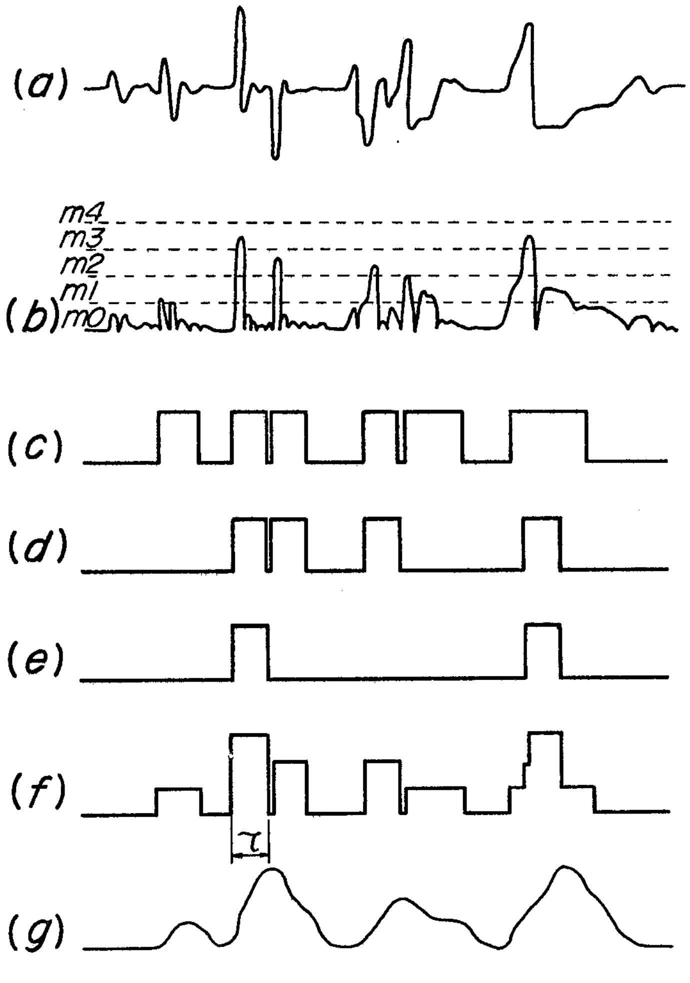
FIG. 5 illustrates waveforms appearing in different parts of the system shown in FIG. 4.

Reference numeral 20 indicates an adder circuit for adding up the outputs of monostable multivibrators 19, 19′, 19″ . . . $\mathbf{19^{(n)}}$. The output of the circuit 20 has a waveform as illustrated in FIG. 5*f* and is passed through a low-pass filter 21, the output of which has a waveform shown in FIG. 5*g* and is delayed by $\tau$ seconds with respect to the filter input (FIG. 5*f*). From comparison between FIGS. 5*b* and 5*g*, it will readily be seen that the waveform of the filter output (FIG. 5*g*) is really an envelope of the waveform of the rectifier output (FIG. 5*b*) only with a time delay of $\tau$ seconds relative thereto. This makes it possible to superpose a disturbance signal varying in amplitude in response to that of the desired signal by reversing the polarity of the filter output waveform (FIG. 5*g*), varying the amplitude of the disturbance signal proportionally to that of the reversed filter output and adding the desired signal to such disturbance signal with a time delay of $\tau$ seconds. Reference numeral 22 indicates a signal generator which generates an audible-frequency disturbance signal of sinusoidal waveform.

An amplitude-modulator 23 is provided to modulate the output of the disturbance-signal generator 22 by the output of the low-pass filter 21 (FIG. 5*g*). The polarity of the envelope is made opposite to that of the desired signal, as will be readily understood.

The reference numeral 24 indicates a delay circuit for delaying the desired signal by $\tau$ seconds; and 25 indicates a mixer circuit for mixing the desired signal from the delay circuit 24 with the disturbance signal 23 as modulated by an envelope opposite in polarity to that of the envelope of the desired signal.

Thus, the output 26 of the mixer circuit 25 includes a disturbance signal decreased or increased in amplitude as that of the desired signal is increased or decreased. In this manner, a composite signal can be obtained which has an amplitude never exceeding a predetermined value and use of such signal is highly desirable particularly in FM transmission.

Next, when such signal is received by the reception system shown in FIG. 2, the output of the detector circuit 12 has a frequency spectrum expressed by the general formula $$\Sigma\omega_s+\omega_1+U[(\Sigma\omega_x)'+\omega_1]+V[\omega_1-(\Sigma\omega_s)']$$

where $\Sigma\omega_s$ represents the frequency spectrum of the desired signal, $\omega_1$ represents the sinusoidal audible-frequency disturbance signal, $\Sigma\omega_s'$ represents the envelope of the desired signal as shown in FIG. 5*g*, and $$U[(\Sigma\omega_s)'+\omega_1],\ V[\omega_1-(\Sigma\omega_s)']$$

represent the upper and lower side-band waves formed by the modulator circuit 23, respectively. In this formula, $\omega_1$ can be removed by the band-stop filter 13 but U and V offer some problem. According to the present invention, the problem can be solved by limiting the envelope of the desired signal to an inaudible frequency range, for example, below 10 cycles per second to enable the band-stop filter 1 to remove U and V with ease and without the need of enlarging the rejecting bandwidth of the filter 13.

In case the envelope of the desired signal is to be obtained below an inaudible frequency, it is desirable to satisfy the relationship $$2d>1/f_c$$

where $f_c$ represents the cutoff frequency of the low-pass filter 21 in FIG. 4 and $d$ represents the width, obtained along the time axis, of the monostable multivibrators 19, 19′, 19″ . . . $\mathbf{19^{(n)}}$. The reason for this is that, if the monostable multivibrators have a high repetition frequency compared to $f_c$, the peak values of the signal cannot be detected as its amplitude after passage through the low-pass filter 21 is lost.

As long as the above relationship is satisfied, even where the time interval between the positive and negative peaks of the desired signal is shorter than $1/f_c$ second, all the peaks that occur during the period of $1/f_c$ second are accommodated in a single pulse generated by the monostable multivibrator 19 and thus no peaks disappear in the low-pass filter 21.

These components of the embodiment shown in FIG. 4 may, for example, have the following specific values. Namely, the width, obtained along the time axis, of the monostable multivibrators 19, 19', 19'' . . . $19^{(n)}$ is 75 milliseconds, the cutoff frequency $f_c$ of the low-pass filter 21 is 10 cycles per second, and the delay circuit 24 is designed to produce a time delay of approximately one second with use of an endless tape.

It will be noted that the rectifier circuit 18 is not needed where the positive and negative polarity sides of the desired signal can be regarded as symmetrical to each other.

From the foregoing it will be appreciated that the communication system of the present invention can transmit programs without the danger that the programs transmitted be poached by outsiders while employing an extremely simple circuit arrangement and also is highly advantageous from the standpoint of manufacturing cost.

The inventive communication system is particularly valuable for FM transmission as long as it is arranged so as to maintain the amplitude of the combined desired and disturbance signal at a predetermined value as described in connection with the second embodiment of FIG. 4.

Further, it will be understood that conventional radio receiving sets can readily be converted into ones usable for reception of SCA broadcasts by providing on the receiver side an adapter incorporating a filter for removal of the disturbance signal.

What is claimed is:

1. A transmission system for use in a subscription radio communication system comprising a source of information signals, means for generating and modifying a disturbance signal, means for mixing the information signal and the modified disturbance signal in a proper time relation to produce a composite signal and an output means for radiating the composite output signal from the mixing means, said means for generating and modifying a disturbance signal comprising a disturbance signal generator, rectifier means for full-wave rectifying a portion of the information signal, first circuit means connected to said rectifier means for quantizing the rectified information signal, second circuit means connected to said first circuit means for producing from said quantized information signal an envelope of the waveform corresponding to said full-wave rectified information signal and for delivering an output by phase inverting said envelope, modulator means separately connected to said disturbance signal generator and said second circuit means for amplitude modulating the disturbance signal with said phase-inverted output so that the modulated output may have an amplitude varying so as to be selectively decreased and increased in accordance with the variation of the amplitude of said information signal whereby the amplitude of the composite signal from said mixing means is maintained substantially constant.

References Cited

UNITED STATES PATENTS

| | | | |
|---|---|---|---|
| 1,622,033 | 3/1927 | Goldsmith et al. | 325—32 |
| 2,581,124 | 1/1952 | Moe | 332—37 X |
| 2,582,968 | 1/1952 | Deloraine et al. | 325—122 X |

ROBERT L. GRIFFIN, *Primary Examiner.*

JOHN W. CALDWELL, *Examiner.*

J. T. STRATMAN, *Assistant Examiner.*